US005831651A

United States Patent [19]

Usui et al.

[11] Patent Number: 5,831,651

[45] Date of Patent: Nov. 3, 1998

[54] INK JET PRINT HEAD HAVING CERAMIC INK PUMP MEMBER WHOSE THIN ORIFICE PLATE IS REINFORCED BY THICK REINFORCING PLATE, AND METALLIC NOZZLE MEMBER BONDED TO THE ORIFICE OR REINFORCING PLATE

[75] Inventors: Minoru Usui; Takahiro Katakura, both of Suwa; Yukihisa Takeuchi, Aichi-ken; Nobuo Takahashi, Owariasah, all of Japan

[73] Assignees: NGK Insulators, Ltd.; Seiko Epson Corporation, both of Japan

[21] Appl. No.: 609,378

[22] Filed: Mar. 1, 1996

[30] Foreign Application Priority Data

Mar. 6, 1995 [JP] Japan .................................... 7-045352

[51] Int. Cl.$^6$ ...................................................... B32B 31/26

[52] U.S. Cl. ................................................ 347/70; 347/71

[58] Field of Search .......................................... 347/70, 71

[56] References Cited

U.S. PATENT DOCUMENTS

| | | | |
|---|---|---|---|
| 4,680,595 | 7/1987 | Cruz-Uribe et al. | 346/140 R |
| 4,695,854 | 9/1987 | Cruz-Uribe | 386/140 R |
| 4,730,197 | 3/1988 | Reimon et al. | 347/40 |
| 5,376,856 | 12/1994 | Takeuchi et al. | 347/68 |
| 5,475,279 | 12/1995 | Takeuchi et al. | 310/331 |
| 5,512,793 | 4/1996 | Takeuchi et al. | 347/68 |
| 5,617,127 | 4/1997 | Takeuchi et al. | 347/68 |
| 5,643,379 | 7/1997 | Takeuchi et al. | 347/68 |

FOREIGN PATENT DOCUMENTS

| | | |
|---|---|---|
| 0584823 | 3/1994 | European Pat. Off. . |
| 6-40030 | 2/1994 | Japan . |

*Primary Examiner*—Daniel P. Malley
*Attorney, Agent, or Firm*—Parkhurst & Wendel

[57] ABSTRACT

An ink jet print head including a ceramic ink pump member and a metallic nozzle member bonded to the pump member through a channel plate, wherein the pump member has a diaphragm plate with a piezoelectric and/or electrostrictive element, a spacer plate having a window, and a laminar structure of an orifice plate and a reinforcing plate which structure cooperates with the diaphragm and spacer plates to define an ink chamber communicating with an ink supply channel formed in the channel plate through an ink inlet hole formed in the reinforcing plate and a minute hole formed in the orifice plate, and further communicating with a nozzle formed in the nozzle member through communication holes formed in the orifice and reinforcing plates, and wherein the channel plate and the nozzle member are bonded to the laminar structure of the pump member.

13 Claims, 5 Drawing Sheets

INK JET PRINT HEAD HAVING CERAMIC INK PUMP MEMBER WHOSE THIN ORIFICE PLATE IS REINFORCED BY THICK REINFORCING PLATE, AND METALLIC NOZZLE MEMBER BONDED TO THE ORIFICE OR REINFORCING PLATE

BACKGROUND OF THE INVENTION

1 Field of the Invention

The present invention generally relates to an ink jet print head, and more particularly to an improved structure of such an ink jet print head which is adapted to change a volume of each ink chamber formed in an ink pump member made of a ceramic material, upon displacement of the corresponding piezoelectric and/or electrostrictive unit or element which consists of an upper and a lower electrode and a piezoelectric and/or electrostrictive layer and which is disposed on a wall of the ink chamber, so that the pressure of an ink in the ink chamber is raised to jet or discharge a droplet of the ink.

2 Discussion of Related Art

In the recent market of printers used as an output device of a computer, for example, there is an increasing demand for an ink jet printer which operates quietly at a relatively low cost. The ink jet printer has an ink jet print head which is adapted to raise the pressure levels in the appropriate ink chambers each filled with a mass of an ink, to thereby jet or discharge droplets or particles of the ink from the corresponding nozzles so as to effect a desired printing.

As one type of the ink jet print head, the assignees of the present invention proposed in JP-A-6-40030 (which corresponds to co-pending U.S. patent application Ser. No. 08/066,193) an ink jet print head wherein an ink pump member uses a ceramic substrate having a three-layer structure. Described more specifically, the ink pump member includes a closure plate, a spacer plate having a plurality of windows which form respective ink chambers, and a connecting plate having pairs of a first and a second communication holes, each pair communicating with the corresponding ink chamber. The spacer, closure and connecting plates are superposed on each other and fired into the integral three-layer ceramic structure. To the thus formed integral ceramic substrate structure of the ink pump member, there is bonded by using a suitable adhesive an ink nozzle member consisting of an orifice plate, a channel plate and a nozzle plate which are made of suitable materials such as stainless steel (SUS), for instance.

In the ink jet print head constructed as described above, the ink pump member formed as an integrally fired structure consisting of ceramic plates or sheets provides an improved sealing between the adjacent plates, without using any adhesive. However, an adhesive is still required for bonding the ink pump member to the ink nozzle member, and for bonding each of the constituent plates of the ink nozzle member together. Thus, the conventional ink jet print head does not necessarily assure complete fluid-tight sealing to prevent leaking of the ink at the interfaces of the plates. In particular, the conventional arrangement experiences difficulty in bonding the ink pump member and the orifice plate which has check valves or orifices in the form of minute holes for directing the ink material to the respective ink chambers. If the adhesive flows or spreads beyond the intended bonding areas of the plates due to dimensional and positioning errors of the plates, the minute holes of the orifice plate would be adversely influenced by the spreading of the adhesive beyond the intended bonding areas, whereby the ink supplying characteristics of the ink jet print head (wherein the ink material is delivered to the ink chambers) may be considerably deteriorated. If the spreading of the adhesive is serious, ink flow channels through the print head may even be plugged with the adhesive.

In an attempt to avoid the above-described problem, the communication holes which communicate with the respective ink chambers formed in the ink pump member of the three-layer ceramic structure may be formed in a smaller size so as to function as the orifices or check valves for permitting the ink material to flow to the ink chambers, in place of the orifices formed in the orifice plate. However, in order to form the minute communication holes serving as the orifices, a green sheet which gives after firing a ceramic plate having the minute communication holes needs to have a small thickness to improve the efficiency of punching operation to form these minute holes. In this case, therefore, the thin green plate does not exhibit a high degree of rigidity, and the minute holes may be deformed, or the positioning accuracy of the minute holes may deteriorate during handling of the thin green plate, namely, during the punching operation thereon or during lamination of the green sheets which give the respective plates of the ink pump member. In an extreme case, the thin green sheet may be broken. Thus, such an attempt is not practically feasible.

SUMMARY OF THE INVENTION

The present invention was made in the light of the above-described situation. It is therefore an object of the invention to provide an ink jet print head which assures excellent fluid-tight sealing around a minute hole which functions as an orifice or check valve for directing the ink material from the ink supply channel to the ink chamber. It is also an object of the invention to provide such an ink jet print head which enables the minute hole to be formed with high stability in dimensional and positioning accuracy while assuring improved handling ease during the manufacture of the ink jet print head.

The above-indicated objects may be achieved according to the principle of the present invention which provides an ink jet print head comprising: a ceramic ink pump member having an ink chamber, and a piezoelectric and/or electrostrictive element for deforming a wall which partially defines the ink chamber, so as to discharge an ink from the ink chamber; and a metallic ink nozzle member having a nozzle through which the ink discharged from the ink chamber is jetted, the ink pump member being superposed on and bonded integrally to the nozzle member via a channel plate which has an ink supply channel for supplying the ink to the ink chamber and an ink outlet hole for feeding the ink to the nozzle, the ink jet print head being characterized in that: the ink pump member is formed as an integrally fired laminar structure consisting of a spacer plate having a window which partially defines the ink chamber, a thin diaphragm plate superposed on one of opposite major surfaces of the spacer plate remote from the ink nozzle member, for closing one of opposite openings of the window, and a laminar structure of a thin orifice plate and a thick reinforcing plate, which laminar structure is superposed on the other major surface of the spacer plate, so as to close the other opening of the window and which cooperates with the spacer plate and the diaphragm plate to provide the ink chamber, the orifice plate having a minute hole formed therethrough, and the reinforcing plate having an ink inlet hole which is formed therethrough and which has a diameter larger than that of the minute hole, so that the ink supply channel of the channel plate communicates with the ink chamber through the minute hole and the ink inlet hole, the orifice plate further having a first communication hole formed therethrough, and the reinforcing plate further having a second communication hole formed therethrough in alignment with the first communication hole, so that the ink chamber communicates with the ink outlet hole of the channel plate through the first communication hole of the orifice plate and the second communication hole of the reinforcing plate; the piezoelectric and/or electrostrictive element is formed on a portion of the diaphragm plate in alignment with the window, the piezoelectric and/or electrostrictive element comprising a piezoelectric and/or electrostrictive unit consisting of a pair of electrodes and a piezoelectric and/or electrostrictive layer; and the ink channel plate and the ink nozzle member are superposed on and bonded integrally to the laminar structure of the ink pump member with an adhesive.

In the ink jet print head constructed according to the present invention, the ink pump member is formed as an integrally fired ceramic laminar structure which includes the orifice plate having a minute hole as an orifice. This ink pump member is bonded to the ink nozzle member at the channel plate whose dimensional tolerance is not so strict, so as to provide an integral structure of the ink jet print head. In this arrangement, the orifice plate is not subjected to the conventionally required bonding with an adhesive. In other words, the present arrangement is free from a possibility that an adhesive existing around the minute hole of the orifice plate enters the minute hole, or flows or spreads between the interfaces of the adjacent plates, leading to deteriorated quality or ink-jetting characteristics of the ink jet print head to be obtained. According to this arrangement, a fluid-tight seal around each of the minute holes is easily established with high stability. Since it is not necessary to take into consideration the flow or spreading of the adhesive, the present arrangement does not require a high degree of dimensional and positioning accuracy of the various components of the ink jet print head, assuring easy assembling and manufacturing of the ink jet print head.

In the present print head, the orifice plate is laminated on the spacer plate integrally together with the relatively thick reinforcing plate. That is, the laminar structure of the relatively thin orifice plate and the relatively thick reinforcing plate is bonded to the spacer plate. According to this arrangement, the thickness of the orifice plate can be made smaller so as to permit easy formation of the minute hole therethrough. That is, a relatively thin green sheet which gives the orifice plate is effectively reinforced by a relatively thick green sheet which gives the reinforcing plate, whereby the green sheet for the orifice plate can be easily handled during manufacture of the ink jet print head. Thus, the present arrangement enables the minute holes to be formed in the orifice plate with high stability and high dimensional and positioning accuracy while assuring easy handling of the orifice plate during the manufacture of the ink jet print head.

According to a first preferred form of the invention, the laminar structure of the orifice plate and the reinforcing plate is superposed on the spacer plate such that the orifice plate is located adjacent to the spacer plate.

In the first preferred form of the invention, the orifice plate and reinforcing plate are superposed on the spacer plate such that the orifice plate is held in contact with the spacer plate, so as to provide an integral structure of the ink pump member. In this arrangement, the reinforcing plate is located outwardly of the orifice plate so that the orifice plate does not suffer from any damage due to collision thereof with other objects during manufacture of the print head. Therefore, the minute hole of the orifice plate can be effectively protected from otherwise possible damage, to thereby assure increased handling ease of the ink pump member during the manufacture.

According to a second preferred form of the invention, the spacer plate has an overhang portion extending from one of opposite ends of the window which is located on a downstream side thereof as viewed in a direction of flow of the ink therethrough, into an area of flow of the ink into the corresponding first communication hole formed in the orifice plate and the corresponding second communication hole formed in the reinforcing plate.

In the second preferred form of the invention, the spacer plate has the overhang portion formed at one of the opposite ends of the window which is on the downstream side as viewed in the direction of the flow of the ink, such that the end of the overhang portion is located inwardly of the corresponding first and second communication holes as viewed in a plane parallel to the direction of flow of the ink through the ink chamber. This arrangement advantageously assures smooth flow of the ink delivered from the ink chamber 30 toward the nozzle of the nozzle member through the communication holes. Even when air bubbles are contained in the ink, the present arrangement enables the air bubbles to be discharged out of the ink chamber, so as to effectively avoid various problems which would be caused by the air bubbles remaining in the ink chamber.

BRIEF DESCRIPTION OF THE DRAWINGS

The above and optional objects, features and advantages of the present invention will be better understood by reading the following detailed description of presently preferred embodiments of the invention, when considered in connection with the accompanying drawings in which:

FIG. 4(*b*) is a fragmentary side elevational view taken along line A—A of FIG. 4(*a*)

DETAILED DESCRIPTION OF THE PREFERRED EMBODIMENTS

Figure 1:
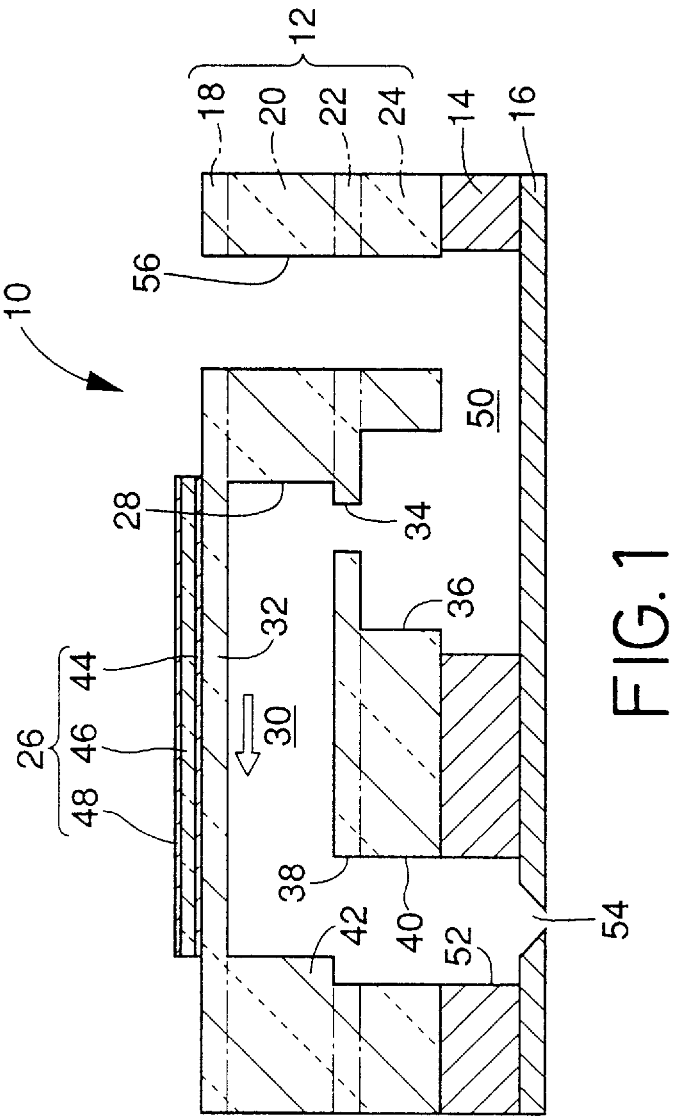
FIG.1 is an elevational view in vertical cross section of one embodiment of an ink jet print head of the present invention.

Referring first to FIG. 1, there is schematically shown an ink jet print head 10 constructed according to one preferred embodiment of the present invention, wherein an ink pump member 12 made of a ceramic material and an ink nozzle member 16 made of a metal are superposed on each other with a channel plate 14 made of a metal or a resin being interposed therebetween, and are bonded together into an integral structure of the ink jet print head 10.

Described more specifically, the ceramic ink pump member 12 includes a thin diaphragm plate 18, a thick spacer plate 20, a thin orifice plate 22 and a thick reinforcing plate 24 which are laminated on each other and fired into an integral ceramic body. On one outer surface of the thus formed ink pump member 12, more specifically, on the outer surface of the diaphragm plate 18, there are integrally formed piezoelectric and/or electrostrictive elements 26 in alignment with respective ink chambers 30.

Figure 2:
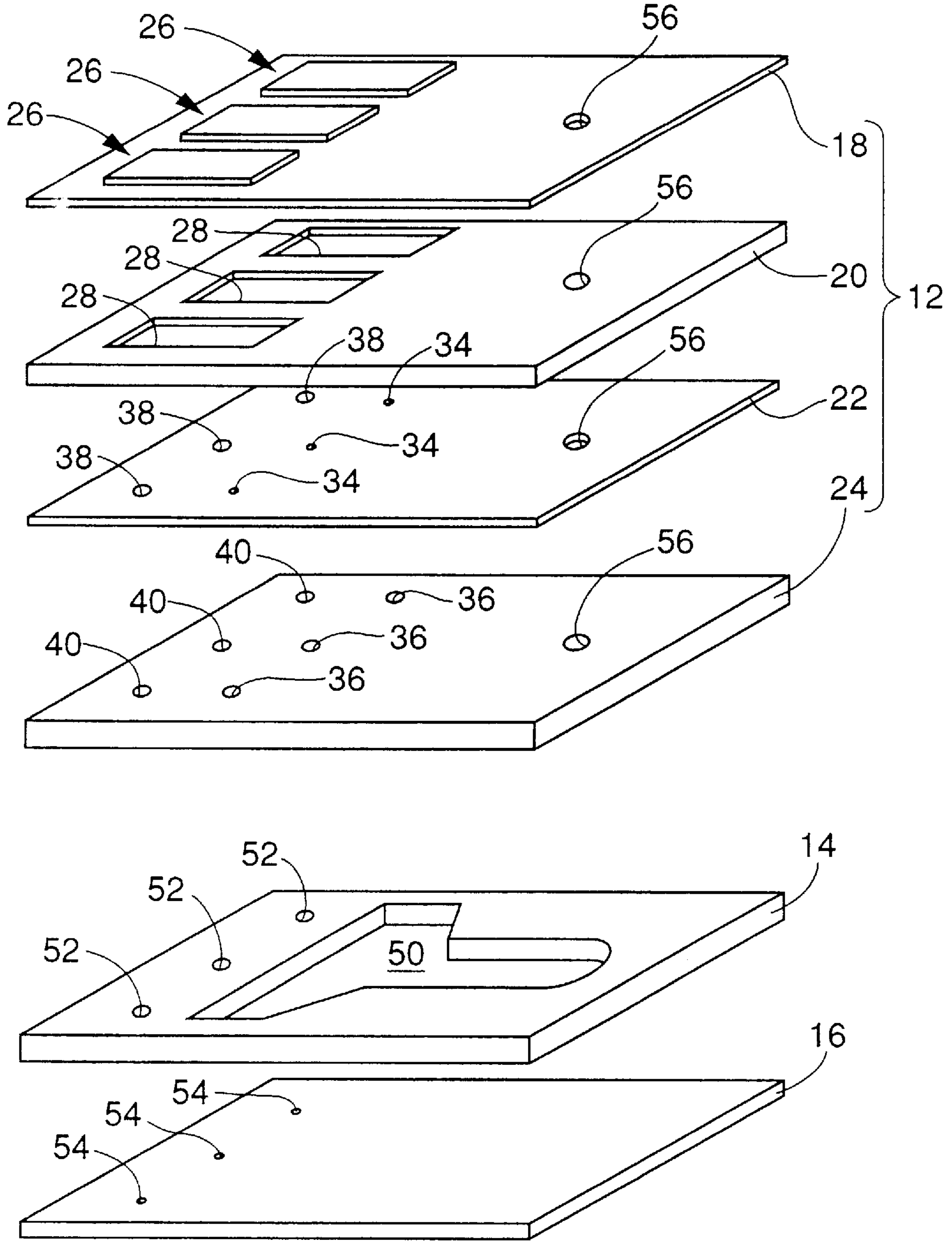
FIG. 2 is an exploded perspective view explaining the structure of the ink jet print head of FIG. 1.

The spacer plate 20 of the ink pump member 12 has a plurality of rectangular windows 28 (three windows 28 in this embodiment) which are formed through the thickness thereof and are arranged in a row in an equally spaced-apart relation with each other, as shown in FIG. 2. These windows 28 are closed at opposite openings thereof by the diaphragm plate 18 and the orifice plate 22, to thereby provide the plurality of ink chambers 30 which correspond to the respective windows 28. Portions of the diaphragm plate 18 which partially define the respective ink chambers 30 serve as diaphragm portions 32. Upon actuation of the appropriate piezoelectric and/or electrostrictive elements 26 (hereinafter referred to as "P/E elements"), the corresponding diaphragm portions 32 are displaced or deformed, whereby the pressure levels in the corresponding ink chambers 30 are raised so as to jet or discharge droplets of an ink material from the ink chambers 30.

The orifice plate 22 of the ink pump member 12 is formed with a plurality of minute holes 34 each of which serves as an orifice for fluid communication with the corresponding ink chamber 30. The minute holes 34 direct the ink material from an ink supply channel 50 to the respective ink chambers 30 and function as check valves for substantially inhibiting the ink from flowing in the reverse direction when the ink is discharged from the ink chambers 30. The minute holes 34 communicate with the ink supply channel 50 via respective ink inlet holes 36, which have a diameter much larger than that of the minute holes 34. The ink inlet holes 36 are formed through the thickness of the reinforcing plate 24 which is integrally laminated on one of the opposite major surfaces of the orifice plate 22 remote from the spacer plate 20. The ink inlet holes 36 are aligned with the respective minute holes 34 of the orifice plate 22, as viewed in a plane perpendicular to the direction of thickness of the plates 22, 24.

The orifice plate 22 further has first communication holes 38 formed therethrough, while the reinforcing plate 24 has second communication holes 40 formed in alignment with the respective first communication holes 38 of the orifice plate 22. These first and second communication holes 38, 40 are communicated with the respective ink chambers 30 and have a diameter much larger than that of the minute holes 34 of the orifice plate 22. The ink material supplied to the ink chambers 30 through the holes 36, 34 is fed through these first and second communication holes 38, 40 and jetted outwards from corresponding nozzles 54 of the nozzle member 16 which will be described. In the present embodiment, the spacer plate 20 has an overhang portion 42 which extends, by a suitable distance, from one of the opposite ends of each window 28 which is on the downstream side as viewed in a direction of a flow the ink material through the ink chamber 30 (as indicated by an arrow in FIG. 1), into an area of ink flow into the corresponding first and second communication holes 38, 40 of the orifice and reinforcing plates 22, 24.

In the ink pump member 12 constructed as described above, the diaphragm plate 18 generally has a thickness of 50 μm or smaller, preferably, 20 μm or smaller, more preferably, within a range of about 3 μm to about 12 μm. The spacer plate 20 generally has a thickness of at least 10 μm, preferably, at least 30 μm, more preferably, at least 50 μm. The total thickness of the orifice plate 22 and the reinforcing plate 24 is generally at least 100 μm, preferably, at least 150 μm. It is noted that the thickness of the orifice plate 22 is determined so as to permit stable, accurate formation of the minute holes 34 through the thickness of the orifice plate 22. In view of this, the orifice plate 22 generally has a thickness of 100 μm or smaller, preferably, 50 μm or smaller, more preferably, within a range of about 5 μm to about 20 μm.

In the ink pump member 12 which is formed as an integral ceramic structure consisting of the four plates 18, 20, 22, 24 as described above, the diaphragm plate 18 and the spacer plate 20 constitute an upper ceramic cavity structure while the orifice plate 22 and the reinforcing plate 24 constitute a lower ceramic cavity structure.

The ink pump member 12 in the present embodiment is formed as an integrally fired ceramic structure. More specifically, green sheets for the plates 18, 20, 22, 24 are initially formed so as to have the respective thickness values by using slurries or pastes that are prepared from ceramic materials, binders, solvents, and other additives as needed, by means of a generally used device such as a doctor blade device, a reverse roll coater or a screen printing device. For establishing stable and secure sealing at the interfaces of the green sheets when the green sheets are laminated on each other, a slurry containing a relatively large amount of the binders may be suitably printed on the interfaces of the green sheets. Subsequently, the green sheets are subjected to suitable mechanical forming operation such as laser cutting, machining, or punching, as needed, to form the windows 28, minute holes 34, ink inlet holes 36, and first and second communication holes 38, 40. Thus, precursors for the plates 18, 20, 22, 24 are obtained. When the green sheets are subjected to the laser machining operation, the wavelength of the laser beam is generally held in a range of about 200 nm to about 1000 nm. Each of these plates may be formed of a plurality of green sheets. For instance, it is possible to form a precursor for the reinforcing plate 24 by a plurality of green sheets.

The thus obtained precursors for the plates 18, 20, 22, 24 are superposed on each other to provide a green laminar structure of the ink pump member 12 as shown in FIG. 1, and co-fired into the integrally fired structure of the ink pump member 12. The precursors for these plates 18, 20, 22, 24 may be laminated in two or more steps as needed. In the ink pump member 12 as shown in FIG. 1, for instance, since the spacer plate 20 having the windows 28 is superposed on the thin orifice plate 22, the lamination of the relatively soft green sheets 20 may not be accomplished under a sufficient pressure due to the presence of the windows 28 if all the green sheets are laminated concurrently in one step to provide the laminar structure of the ink pump member 12. This unfavorably results in incomplete lamination and sealing of the constituent plates of the ink pump member 12. Further, a portion of the orifice plate 22 may enter the windows 28, and the minute holes 34 may be deformed, unfavorably deteriorating the dimensional accuracy thereof. To avoid these drawbacks, it is desirable that the precursors (green sheets) for the orifice plate 22 and the reinforcing plate 24 be first laminated on each other under pressure and heat, to thereby provide a first preliminary laminar structure. In this case, the precursors (green sheets) for the spacer plate 20 and the diaphragm plate 18 are superposed on the thus formed preliminary laminar structure, and the assembly is fired into the integral fired structure of the ink pump member 12. Alternatively, the precursors for the spacer plate 20 and the diaphragm plate 18 are laminated on each other under pressure and heat, to thereby provide a second preliminary laminar structure, which is then superposed on the above-indicated first preliminary laminar structure, and the assembly is fired into the integral fired structure of the ink pump member 12. Although the minute holes 34 are generally formed by punching appropriate portions of the precursor (green sheet) for the orifice plate 22, the minute holes 34 may be otherwise formed. For instance, the minute holes 34 may be formed by effecting the punching or laser machining operation on the above-described first preliminary laminar structure, or on the integrally fired laminar structure of the ink pump member 12.

On the ink pump member 12 obtained as described above, more precisely, on the outer surface of the diaphragm plate 18, there are formed the P/E elements 26 in alignment with the respective ink chambers 30, to thereby provide the intended ink pump member 12 in the form of a piezoelectric and/or electrostrictive film type actuator. Each of the P/E elements 26 is a piezoelectric and/or electrostrictive unit (hereinafter referred to as "P/E unit") consisting of a lower and an upper electrode 44, 48 and a piezoelectric and/or electrostrictive layer (hereinafter referred to as "P/E layer") 46 interposed therebetween. The P/E elements 26 are provided on the outer surface of the diaphragm plate 18, by bonding respective strips of a known P/E unit blank to the appropriate portions of the diaphragm plate 18. Alternatively, the lower electrode 44, P/E layer 46 and upper electrode 48 are successively formed in lamination on the outer surface of the diaphragm plate 18 by any one of known film-forming methods, so as to form the intended P/E units. The materials for the electrodes 44, 48 and the P/E layer 46 are suitably selected from among various known materials. For instance, the materials as proposed in the above-identified Publication are suitably employed for forming the electrodes 44, 48 and the layer 48. This Publication also discloses a ceramic material which is suitable for forming the ink pump member 12. It is preferable in the present invention to employ such a ceramic material for forming the diaphragm plate 18, spacer plate 20, orifice plate 22 and reinforcing plate 24.

To the thus formed ink pump member 12, the channel plate 14 and the ink nozzle member 16 are laminated and bonded as well known in the art by using a suitable adhesive, so as to provide the intended ink jet print head 10.

The channel plate 14 superposed on and bonded to the ink pump member 12 has an ink supply channel 50 which is connected to an exterior ink reservoir via a through-hole 56 which is formed at a predetermined portion of the ink pump member 12 through the entire thickness thereof. The ink which is fed to the ink supply channel 50 from the ink reservoir is supplied to the appropriate ink chambers 30 via the corresponding ink inlet holes 36 and minute holes 34 that are formed in the reinforcing plate 24 and orifice plate 22, respectively. The channel plate 14 further has ink outlet holes 52 which are aligned with the respective first and second communication holes 38, 40 of the orifice plate 22 and reinforcing plate 24, as viewed in a plane perpendicular to the direction of thickness of the plates 14, 22, 24. These ink outlet holes 52 have a diameter which is equal to that of the first and second communication holes 38, 40. The ink nozzle member 16 has the plurality of nozzles 54 formed therethrough, in alignment with the ink outlet holes 52 of the channel plate 14. The ink supplied to the appropriate ink chambers 30 is fed through the corresponding first and second communication holes 38, 40 and ink outlet holes 52 and is jetted outwards from the corresponding nozzles 54.

The channel plate 14 and the nozzle member 16 are bonded together as well known in the art by using a known adhesive. For instance, the channel plate 14 and ink nozzle member 16 are bonded to each other using a suitable adhesive according to any one of the methods proposed in the above-identified Publication. The channel plate 14 is formed of a metal such as nickel or stainless steel, or a resin, in view of the formability of the ink supply channel 50 and ink outlet holes 52 and the manufacturing cost of the ink jet print head, while the ink nozzle member 16 is made of a metal such as nickel or stainless steel that permits the nozzles 54 to be formed with high dimensional accuracy.

In the ink jet print head 10 wherein the ink nozzle member 16 is integrally bonded to the ceramic ink pump member 12 with the channel plate 14 interposed therebetween, the ink is effectively supplied from the ink supply channel 50 to the ink chambers 30, so as to assure a high degree of freedom in design of the ink flow channel. In the present ink jet print head 10 having the plurality of ink chambers 30 as shown in FIG. 2, a desired image is formed by ink jetting by suitably controlling the pressure level in each of the ink chambers 30, while the ink is supplied to the individual ink chambers 30 through the ink supply channel 50 formed in a suitable pattern in the channel plate 14.

The present ink jet print head 10 constructed as described above has the ink pump member 12 formed as the integrally fired ceramic laminar structure which includes the orifice plate 22 having the minute holes 34 each of which functions as an orifice. In the thus formed ink jet print head 10, the plates 18, 20, 22, 24 laminated on each other are fired into the integral structure of the ink pump member 12 without using any adhesive, while assuring sufficient sealing between the adjacent plates over the entire contacting surfaces thereof. Accordingly, the present ink jet print head 10 is free from the conventionally experienced problem that the adhesive used for bonding the plates together flows into the minute holes 34 and adversely influences the function of the minute holes 34 as orifices, resulting in plugging or closure of the ink flow channel formed in the ink jet print head. Since the present arrangement does not use any adhesive for bonding the plates together, there is no possibility that the adhesive enters or spreads between the contacting surfaces of the adjacent plates, and thereby unfavorably creates gaps therebetween. Accordingly, the present ink jet print head 10 does not suffer from turbulence of the ink flow through the ink flow channel in the ink jet print head 10, which would result from the presence of the gaps formed between the adjacent plates. Accordingly, the present ink jet print head 10 is completely free from reduction of the ink pressure, which reduction would be caused by the air remaining in the gaps. Therefore, the ink jet print head constructed according to the present invention favorably eliminates the problem of deteriorated quality or ink-jetting characteristics of the print head which would arise from the use of the adhesive.

The present ink pump member 12 which includes the orifice plate 22 having the minute holes 34 is formed as the integrally fired ceramic laminar structure as described above. This arrangement readily assures a fluid-tight seal around each of the minute holes 34 formed in the orifice plate 22. In addition, it is not necessary to take into consideration the flow, spreading or dislocation of the adhesive when determining the dimensional and positioning tolerances of the print head 10. In other words, the present arrangement does not require high degrees of dimensional and positioning accuracy in making and assembling the components of the ink jet print head, leading to easier manufacture of the ink jet print head 10.

In the instant embodiment, the thickness of the orifice plate 22 can be made smaller owing to the presence of the reinforcing plate 24 which is fixed to one major surface of the orifice plate 22 remote from the spacer plate 20. According to this arrangement, the orifice plate 22 is advantageously protected during handling thereof in the manufacturing process of the print head, by the reinforcing plate 24 having relatively large thickness and rigidity. Thus, the present ink jet print head 10 enables the minute holes 34 to be formed in the orifice plate 22 with high stability and high positioning accuracy while assuring safe and easy handling of the orifice plate 22. Further, owing to the provision of the overhang portion 42 formed at one of the opposite ends of each window 28 which is on the downstream side as viewed in the direction of the flow of the ink, so as to extend into the area of ink flow into the first and second communication holes 38, 40, the discharge flow of the ink out of the ink chamber 30 is made smooth, and air bubbles if contained in the ink material may be easily removed from the ink chamber 30.

In the present ink pump member 12 wherein the orifice plate 22 integrally backed by the reinforcing plate 24 is superposed on the spacer plate 20, the thickness of the reinforcing plate 24 can be increased so as to reduce the thickness of the orifice plate 22, making it easier to form the minute holes or orifices 34 in the orifice plate 22 by punching operation. Thus, the efficiency and accuracy of formation of the minute holes 34 are effectively improved. The presence of the reinforcing plate 24 advantageously increases the mechanical strength of the bottom wall of each ink chamber 30 which is provided by the orifice plate 22, whereby the orifice plate 22 is effectively protected against otherwise possible damage which would be caused by stresses generated in handling the integral structure of the ink pump member 12 and in forming the P/E units on the integral structure by the film-forming method, throughout the manufacturing process of the ink jet print head 10, which process includes the steps of laminating the green sheets, firing the laminated green sheets, and forming the P/E units on the integral fired structure of the ink pump member 12. In addition, the thickness of the bottom wall of each ink chamber 30 partially defined by the orifice plate 22 is increased by the reinforcing plate 24, so as to increase the rigidity of the bottom wall. Accordingly, when the actuator (ink pump member 12) is bonded to the channel plate 14, the bottom wall of the ink chamber 30 whose thickness is increased by the reinforcing plate 24 receives a sufficient force applied to the ink pump member 12 when the ink pump member 12 is pressed onto the channel plate 14 to bond together the ink pump member 12 and the channel plate 14, whereby a significantly improved sealing is obtained at the bonding surfaces of the reinforcing plate 24 and the channel plate 14. In case where the thickness of the bottom wall of the ink chamber 30 is relatively small, the bottom wall tends to be easily deflected, so that the pressing force is not adequately transmitted to the interface between the ink pump member 12 and the channel plate 14, resulting in incomplete sealing at their bonding surfaces.

In the instant embodiment, the ink pump member 12 is formed such that the spacer plate 20 of the upper ceramic cavity structure is superposed on the orifice plate 22 of the lower ceramic cavity structure, so that the minute holes 34 formed in the orifice plate 22 are effectively prevented from being damaged or deformed, owing to the presence of the reinforcing plate 24 which backs the orifice plate 22.

Figure 3:
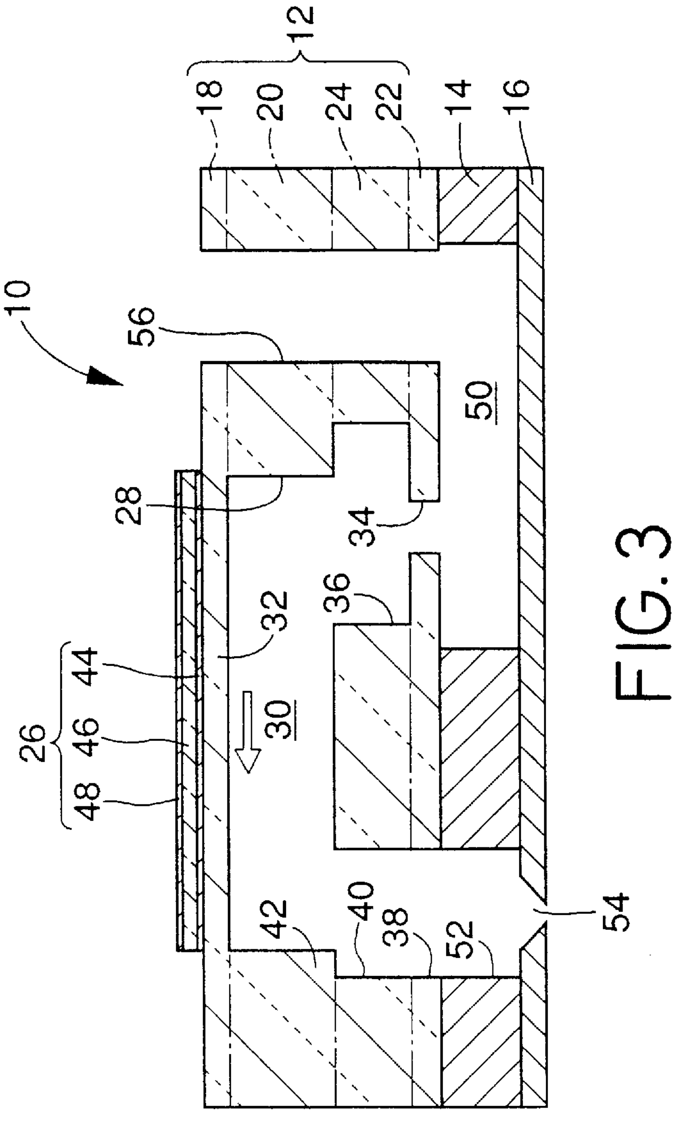
FIG. 3 is an elevational view in vertical cross section corresponding to that of FIG. 1, showing another embodiment of an ink jet print head of the invention.

It is noted that the relative position of the orifice plate 22 and the reinforcing plate 24 may be reversed as shown in FIG. 3, with respect to that of FIGS. 1 and 2. That is, in the ink jet print head 10 of FIG. 3, the integral fired structure of the ink pump member 12 is formed such that the spacer plate 20 of the upper ceramic cavity structure is superposed on the reinforcing plate 24 of the lower ceramic cavity structure. In this case, the channel plate 14 is bonded to the orifice plate 22 of the ink pump member 12, so as to provide the ink jet print head 10 of FIG. 3.

Figure 4A:
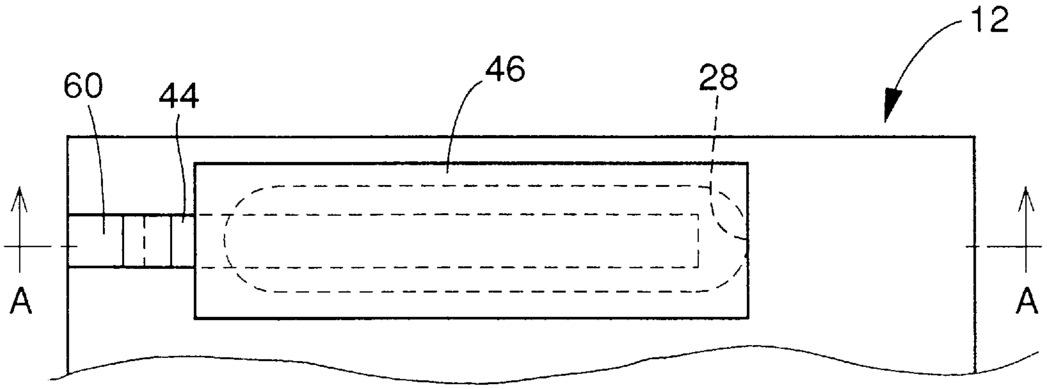
FIG. 4(*a*) is a fragmentary plan view of the ink jet print head of the invention, showing one example of wiring the piezoelectric and/or electrostrictive unit on the ink pump member of the ink jet print head (wherein the upper electrode is not shown)
Figure 4B:
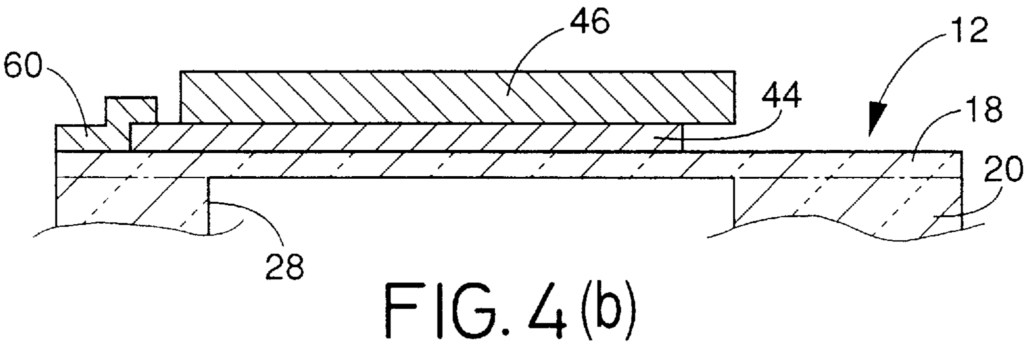

Referring next to FIGS. 4(*a*) and 4(*b*), there is shown one example of wiring the P/E unit on the ink pump member 12 of the ink jet print head 10. Described specifically, the lower electrode 44 is initially formed of platinum on the outer surface of the diaphragm plate 18 of the ink pump member 12 by a suitable film-forming method. The lower electrode 44 is connected to an external lead wire through a connecting terminal electrode 60. The connecting terminal electrode 60 is formed of silver which exhibits higher wettability with respect to a solder and higher soldering strength than platinum. The connecting terminal electrode 60 has a thickness of about 10–40 $\mu$m, for instance. The lower electrode 44 is connected to the connecting terminal electrode 60 such that the end portion of the connecting terminal electrode 60 overlaps the corresponding end portion of the lower electrode 44 as shown in FIG. 4(*b*). On the lower electrode 44, the P/E layer 46 and the upper electrode 48 (not shown) are formed in a known manner by a film-forming method.

Figure 5:
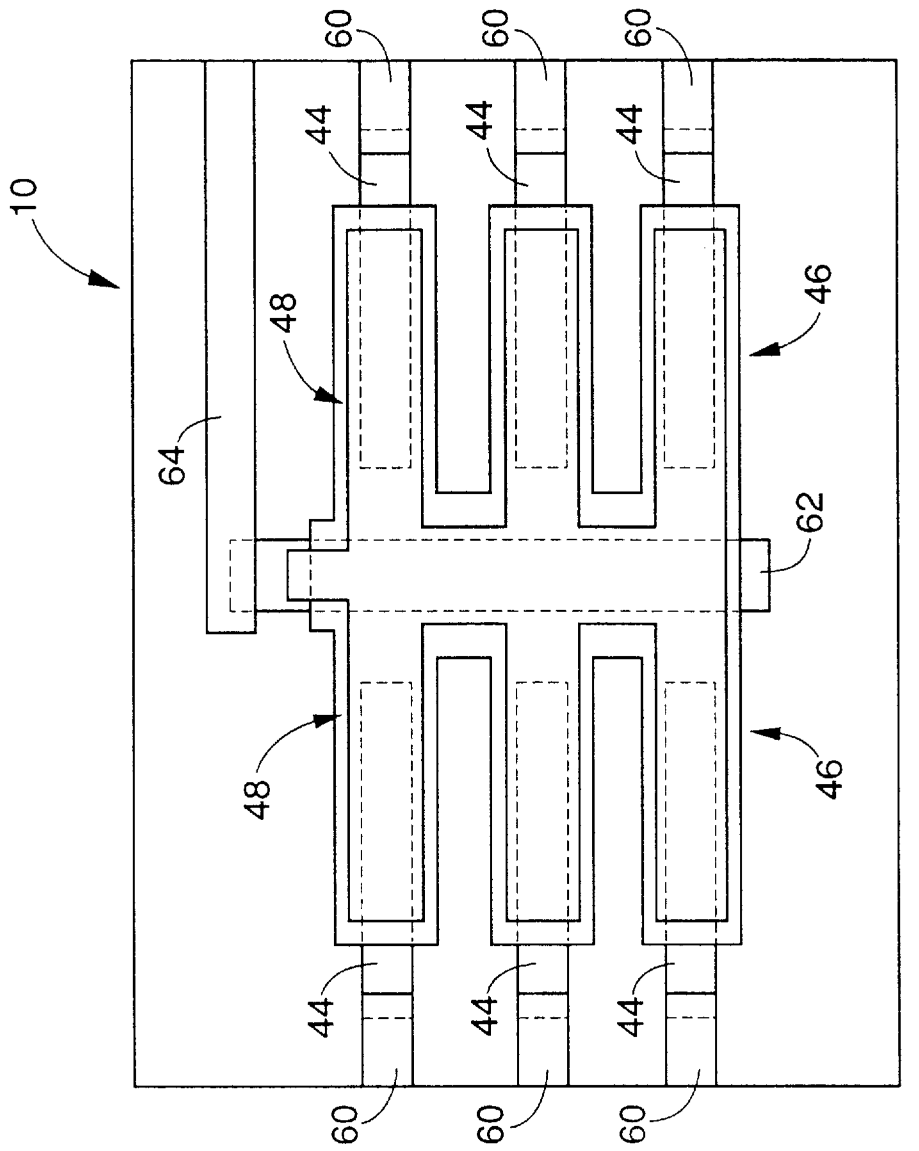
FIG. 5 is a plan view corresponding to that of FIG. 4(*a*), showing one example of wiring a plurality of piezoelectric and/or electrostrictive units on the ink pump member of the ink jet print head.

Referring to FIG. 5, there is shown one example of wiring a plurality of P/E units on the ink pump member of the ink jet print head 10. Described in detail, in the print head 10 of FIG. 5, two rows (left and right in FIG. 5) each consisting of three P/E units are disposed on the ink pump member. As in the example of FIG. 4, each of the lower electrodes 44 formed of platinum on the outer surface of the ink pump member by the film-forming method is connected to the external lead wire through the corresponding connecting terminal electrode 60 formed of silver. Each lower electrode 44 is connected to the corresponding terminal electrode 60 such that the end portion of the terminal electrode 60 overlaps the end portion of the lower electrode 44. Between the left and right rows of the lower electrodes 44, there is interposed an auxiliary electrode 62 which is formed of platinum and which extends in the vertical direction of FIG. 5 parallel to the two rows of the lower electrodes 44. The P/E layers 46 formed on the respective lower electrodes 44 have a common part connecting the upper electrode 48 to its connecting terminal electrode 64 which will be described. The upper electrode 48 is formed on the P/E layers 48 by applying a pattern of a printing paste of gold and a resin on the P/E layers 48 and firing thereof. The upper electrode 48 is formed as a single common electrode for all the P/E units, so that the number of connecting terminals connected to the external lead wire is reduced. The connecting terminal electrode 64 which connects the upper electrode 48 to the external lead wire is formed of silver.

While the present invention has been described in its preferred embodiments with a certain degree of particularity, it is to be understood that the invention is not limited to the details of the illustrated embodiments, but may be embodied with various changes, modifications and improvements, which may occur to those skilled in the art, without departing from the spirit and scope of the invention defined in the following claims.

What is claimed is:

1. An ink jet print head comprising: a ceramic ink pump member having an ink chamber, and a piezoelectric and/or electrostrictive element for deforming a wall which partially defines said ink chamber, so as to discharge ink from said ink chamber; and a metallic ink nozzle member having a nozzle through which the ink discharged from said ink chamber is jetted, said ink pump member being superposed on and bonded integrally to said nozzle member via a channel plate which has an ink supply channel for supplying the ink to said ink chamber and an ink outlet hole for feeding the ink to said nozzle, wherein the improvement comprises:

said ink pump member being formed as an integrally fired layered structure consisting of a spacer plate having a window which partially defines said ink chamber, a thin diaphragm plate superposed on one of opposite major surfaces of said spacer plate remote from said ink nozzle member, for closing one of opposite openings of said window, and a laminar structure comprising a thin orifice plate and a thick reinforcing plate, said laminar structure being superposed on the other major surface of said spacer plate, so as to close the other opening of said window and which cooperates with said spacer plate and said diaphragm plate to provide said ink chamber, said orifice plate having a minute hole formed therethrough, and said reinforcing plate having an ink inlet hole which is formed therethrough and which has a diameter larger than that of said minute hole, so that said ink supply channel of said channel plate communicates with said ink chamber through said minute hole and said ink inlet hole, said orifice plate further having a first communication hole formed therethrough, and said reinforcing plate further having a second communication hole formed therethrough in alignment with said first communication hole, so that said ink chamber communicates with said ink outlet hole of said channel plate through said first communication hole of said orifice plate and said second communication hole of said reinforcing plate;

said piezoelectric and/or electrostrictive element being formed on a portion of said diaphragm plate in alignment with said window, said piezoelectric and/or electrostrictive element comprising a piezoelectric and/or electrostrictive unit consisting of a pair of electrodes and a piezoelectric and/or electrostrictive layer; and said ink channel plate and said ink nozzle member being superposed on and bonded integrally to said layered structure of said ink pump member with an adhesive.

2. An ink jet print head according to claim 1, wherein said laminar structure of said orifice plate and said reinforcing plate is superposed on said spacer plate such that said orifice plate is located adjacent to said spacer plate.

3. An ink jet print head according to claim 1, wherein said spacer plate has an overhang portion extending from one of opposite ends of said window which is located on a downstream side thereof as viewed in a direction of flow of the ink therethrough, into an area of flow of the ink into the corresponding first communication hole formed in said orifice plate and the corresponding second communication hole formed in said reinforcing plate.

4. An ink jet print head according to claim 1, wherein said laminar structure of said orifice plate and said reinforcing plate is superposed on said spacer plate such that said reinforcing plate is located adjacent to said spacer plate.

5. An ink jet print head according to claim 1, wherein said ink pump member further comprises a through-hole formed through its entire thickness, said ink supply channel formed in said channel plate being connected to an exterior ink reservoir via said through-hole.

6. An ink jet print head according to claim 1, wherein said minute hole formed in said orifice plate has a diameter smaller than that of said ink inlet hole formed in said reinforcing plate, said minute hole functioning as a check valve for substantially controlling said ink from flowing in a direction from said ink chamber toward said ink supply channel.

7. An ink jet print head according to claim 1, wherein said diaphragm plate of said ink pump member has a thickness not larger than 50 $\mu$m.

8. An ink jet print head according to claim 1, wherein said spacer plate of said ink pump member has a thickness not smaller than 10 $\mu$m.

9. An ink jet print head according to claim 1, wherein said orifice plate and said reinforcing plate of said ink pump member has a total thickness of at least 100 $\mu$m.

10. An ink jet print head according to claim 1, wherein said orifice plate of said ink pump member has a thickness not larger than 100 $\mu$m.

11. An ink jet print head according to claim 1, wherein said channel plate of said ink pump member is formed of a metal.

12. An ink jet print head according to claim 11, wherein said metal is nickel or stainless steel.

13. An ink jet print head according to claim 1, wherein said channel plate of said ink pump member is formed of a resin.

* * * * *